United States Patent Office 2,933,464
Patented Apr. 19, 1960

2,933,464

PELLETIZED ACCELERATION CONTAINING POLYISOBUTYLENE

Irving Gibbs, Stamford, Conn., assignor to R. T. Vanderbilt Company, Inc., New York, N.Y., a corporation of New York No Drawing. Application November 23, 1954
Serial No. 470,789

6 Claims. (Cl. 260—23)

My invention relates to a new product which contains rubber vulcanization accelerators in a more useful and convenient form.

It has heretofore been proposed to prepare pellets containing powdered rubber vulcanization accelerators for use in the compounding of rubber, either natural or synthetic, prior to vulcanization. The accelerators have been manufactured in such form in order to avoid the difficulties which are normally encountered when the finely divided accelerator powders are added to the rubber on a rubber mill. For example, the powders tend to stick to the back or faster roll and to cake or to fall off, instead of becoming readily incorporated or dispersed in the rubber which is banded around the front or slower roll. Powdered accelerators also suffer from the disadvantage that they tend to drop or fall through the rolls. In addition, powdered accelerators are carried as a dust in the air in the vicinity of the mill, and tend to cause irritation to the person operating the mill from the standpoint of undesirable taste, skin irritation or the like.

It has been proposed to manufacture free-flowing pellets which are of uniform composition and which contain aggregates of a powdered benzothiazole, thiuram sulfide or dithiocarbamate salt rubber vulcanization accelerator. The particles of the accelerator are held together in pellet form with a binder which comprises a mixture of a dried rubber latex and a hardening agent, such as a protein, vegetable gum, starch, dextrose, carboxy alkyl cellulose or sodium rosinate.

In accordance with my present invention, I have been able to prepare rubber vulcanization accelerators and mixtures of accelerators in an improved form. My products contain a completely saturated, non-vulcanizable elastomeric binder which is unaffected by combinations of accelerators with sulfur or other vulcanizing agents. As a result, my products are of improved stability on storage and also of improved dispersibility when incorporated into rubber stocks. In addition, my products disperse in a wide variety of rubber stocks with ease. For example, they disperse well in soft natural rubber stocks as well as in GR–S. My invention provides the rubber industry for the first time with an easily dispersible, non-dusty, free-flowing, one package accelerator-vulcanizing agent combination.

The new products which I have invented are free-flowing pellets of uniform composition which are composed of aggregates containing one or more powdered rubber vulcanization accelerators. Such accelerators can be thiazoles, such as 2-mercaptobenzothiazole, the zinc salt of 2-mercaptobenzothiazole, 3-anilinomethyl-2(3)-benzothiazolethione, dibenzothiazyl disulfide or the like. On the other hand, such accelerators can be thiurams, such as tetramethyl thiuram disulfide, tetramethylthiuram monosulfide, tetraethyl thiuram disulfide or the like. Also, if desired, such accelerators can be dithiocarbamates, such as zinc dimethyl dithiocarbamate, zinc diethyl dithiocarbamate, zinc dibutyl dithiocarbamate, zinc N-pentamethylene dithiocarbamate, 2,4-dinitrophenyl dimethyl dithiocarbamate, selenium diethyl dithiocarbamate and so forth.

In addition to the accelerator or mixture of accelerators, the free-flowing pellets of my invention contain polyisobutylene as a primary binder. The polyisobutylene has an average molecular weight within the range from 100,000 to 200,000, and the amount of polyisobutylene is within the range from 4 to 10 percent by weight, based upon the weight of the accelerator or mixtures of accelerators. With less than four parts of polyisobutylene per 100 parts of accelerator powder, the advantages of my invention are not obtained because there is not enough polyisobutylene present to coat the accelerator particles sufficiently to give rapid and complete dispersion when incorporating the pellets in a soft stock on a rubber mill. With more than 10 parts of polyisobutylene per 100 parts of accelerator, the pellets become too rubbery and somewhat tacky so that they tend to lump or pack together during storage or shipment.

In addition to the accelerator or mixture of accelerators and the polyisobutylene, the pellets of my invention will also contain from 2 to 6 percent by weight, based upon the weight of the accelerator or mixture of accelerators, of a fatty acid containing from 12 to 18 carbon atoms, such as lauric acid, myristic acid, palmitic acid, margaric acid, stearic acid, or oleic acid. Mixtures of fatty acids derived from the naturally-occurring animal or vegetable glycerides, for example the fatty acids derived from coconut oil, palm oil or the like, can also be used.

I contemplate supplying my accelerator pellets to the industry in a non-dusty easily pourable pelletized form. This is accomplished by extrusion through a perforated die having holes of about ⅛ inch to about ¼ inch in diameter. The polyisobutylene is added to the mixture to be extruded in the form of a latex. Also in the mixture which is extruded, the fatty acid is present therein in the form of a nitrogen base salt, such as the ammonium, monomethylamine, dimethylamine, monoethylamine or diethylamine salt, and about 2 or 3 times the stoichiometric amount of nitrogen base required to neutralize the acid is present to aid in wetting the powdered accelerator. If desired, additional extrusion aids which are lubricants, such as glycerol, paraffinic or naphthenic mineral oils or polyoxyethylene esters of fatty acids (e.g., 8-polyoxyethylenemonostearate, 10-polyoxyethylenemonolaurate, and the like) can be included in the composition to be extruded to the extent of up to 6 percent by weight, based upon the weight of the accelerator or mixture of accelerators. After the extrusion operation has been carried out, the product is dried at a somewhat elevated temperature, this drying operation serving to drive off the excess nitrogen base and the nitrogen base present in the salt of the fatty acid.

As stated above, the pellets of my invention, in addition to including the accelerator or mixture of accelerators, can also include sulfur as a vulcanizing agent. When used, the amount of sulfur present in the final product should be such that the final product contains between 86 and 94 percent by weight of accelerator or mixture of accelerators and sulfur, based upon the weight of the final product. It is not possible to go above 94 percent and maintain the benefits of the use of the polyisobutylene, while less than 86 percent results in loss of activity in spite of improved dispersion due to the use of the polyisobutylene.

The following examples illustrate the present invention and are to be considered not limitative.

EXAMPLE I

In a double ribbon blender with a 50-gallon working capacity were placed 150 pounds of powdered benzothiazyl disulfide and, with the blender running, 5 pounds of oleic acid were run in over a period of approximately one minute. Blending was continued until the oleic acid was thoroughly distributed. To a 20-gallon tank equipped with an agitator were added 83 pounds of water, 5 pounds of 26° Bé. ammonia, and 23.3 pounds of 50% by weight solids polyisobutylene latex of 150,000 average molecular weight. After thorough mixing the liquid was poured into the blender and blended approximately 10 minutes. The batch was transferred to an extrusion machine and extruded with direct screw pressure through a plate containing between 100 and 200 ⅛" diameter circular orifices. The extrudate was cut into spaghetti-like rods, collected on 36" x 36" x 1" pans, and dried to less than 0.5% moisture at 180° F. The rods were broken up into ¾" lengths +½" by pouring them through a 1" mesh screen into a drum for shipment.

EXAMPLE II 450 grams of zinc dimethyl dithiocarbamate were blended with 10 grams of oleic acid in a two-quart capacity open mixer of the Hobart type. A mixture containing 150 g. of water, 10 g. of 26° Bé. ammonia, 15 g. of glycerine, and 50 g. of 50% by weight solids polyisobutylene latex of 150,000 average molecular weight was added slowly and blended thoroughly. The blend was transferred to a small extruder and treated similarly to Example I. The rods were dried on an air blown oven at 150° F. overnight and rods were obtained which dispersed very rapidly in either natural rubber, chloroprene, butadiene-styrene, butadiene-acrylonitrile or butyl rubber.

EXAMPLE III

Satisfactory rods were made according to the process in Example I using 150 pounds of bismuthous dimethyl dithiocarbamate, 8.33 pounds of oleic acid, 33.3 pounds water, 8.33 pounds ammonia (26° Bé.), and 16.7 pounds of 50% solids polyisobutylene latex of 150,000 average molecular weight.

EXAMPLE IV

The table below sets forth various compositions which can be extruded in accordance with the procedure described in Example I, dried at 125° F. and broken up to form pellets falling within the scope of my invention. The quantities are by weight.

Table

|  | A | B | C | D | E |
|---|---|---|---|---|---|
| Benzothiazyl Disulfide | 180 | 150 |  |  |  |
| Zinc Dimethyl Dithiocarbamate | 270 | 210 |  |  |  |
| Tetramethyl Thiuram Monosulfide |  |  | 180 | 190.25 | 190.25 |
| Zinc Mercaptobenzothiazole |  |  | 360 | 100. | 100. |
| Sulfur |  | 180 | 360 | 159.75 | 159.75 |
| Oleic Acid | 15 | 10 | 50 | 10 | 5 |
| 26° Bé. NH₄OH | 15 | 10 | 50 | 10 | 5 |
| 50% Polyisobutylene (150,000 M.W.) | 50 | 60 | 100 | 50 | 50 |
| Glycerine | 10 |  |  | 15 | 20 |
| Water | 190 | 200 | 225 | 100 | 100 |

EXAMPLE V

To a 400 ml. beaker were added 100 grams of water, 10 grams of stearic acid and 10 grams of a mineral oil having a specific gravity of 0.88 and a Saybolt Universal viscosity at 100° F. of 200 seconds. The mixture was heated to 80–90° C. and 10 grams of 26° Bé. ammonia was added to form an emulsion. After the emulsion had formed ,60 grams of 50 percent by weight solids polyisobutylene latex of 150,000 average molecular weight was added. The final emulsion was blended slowly into 450 grams of tetramethylthiuram monosulfide contained in a 2-quart capacity open mixer of the Hobart type. The blend was transferred to a small extruder and extruded as described in Example I.

EXAMPLE VI

Satisfactory rods were made according to Example V using 450 g. of tetramethyl thiuram disulfide, 5 g. of lauric acid, 75 g. of water, 5 g. of 26° Bé. ammonium hydroxide, 60 g. of 50% solids polyisobutylene latex and 15 g. of polyoxyethylene stearate which is a combination wetting and lubricating agent. The particular polyoxyethylene ester used had a specific gravity of 1.02, a flash point of 500° F., a titer of 28° C. and 8 ethylene oxide groups attached to the stearic acid.

I claim:

1. As a new product, free-flowing pellets of uniform composition composed of aggregates of a powdered rubber vulcanization accelerator selected from the group consisting of benzothiazoles, thiurams and dithiocarbamates, from 4 to 10 percent by weight of a saturated, non-vulcanizable, elastomeric polyisobutylene having an average molecular weight within the range from 100,000 to 200,000 and from 2 to 6 percent by weight of a fatty acid containing from 12 to 18 carbon atoms, the percentages being based upon the weight of the accelerator.

2. A product according to claim 1 containing up to 6 percent by weight of a lubricant, based upon the weight of the accelerator.

3. A product according to claim 1 containing sulfur in amount such that the product contains a total of from 86 to 94 percent by weight of accelerator plus sulfur.

4. A product according to claim 1 in which the accelerator is benzothiazole disulfide and in which the fatty acid is oleic acid.

5. A product according to claim 1 in which the accelerator is zinc dimethyl dithiocarbamate and in which the fatty acid is oleic acid.

6. A product according to claim 1 in which the accelerator is bismuthous dimethyl dithiocarbamate and in which the fatty acid is oleic acid.

References Cited in the file of this patent

UNITED STATES PATENTS

| 2,598,209 | Bartram | May 27, 1952 |
| 2,653,924 | Olin | Sept. 29, 1953 |
| 2,653,925 | Olin | Sept. 29, 1953 |

OTHER REFERENCES

Flory: J. Amer. Chem. Soc., vol. 65, March 1943, pp. 372, 379–382. (Copy in Scientific Library.)